Sept. 30, 1941.  F. Z. PIRKEY  2,257,124

PHOTOGRAPH CORRECTOR SCALE

Filed Sept. 10, 1940  4 Sheets-Sheet 1

INVENTOR
Frank Z. Pirkey
BY *Francis H. Vanderwerken*
ATTORNEY

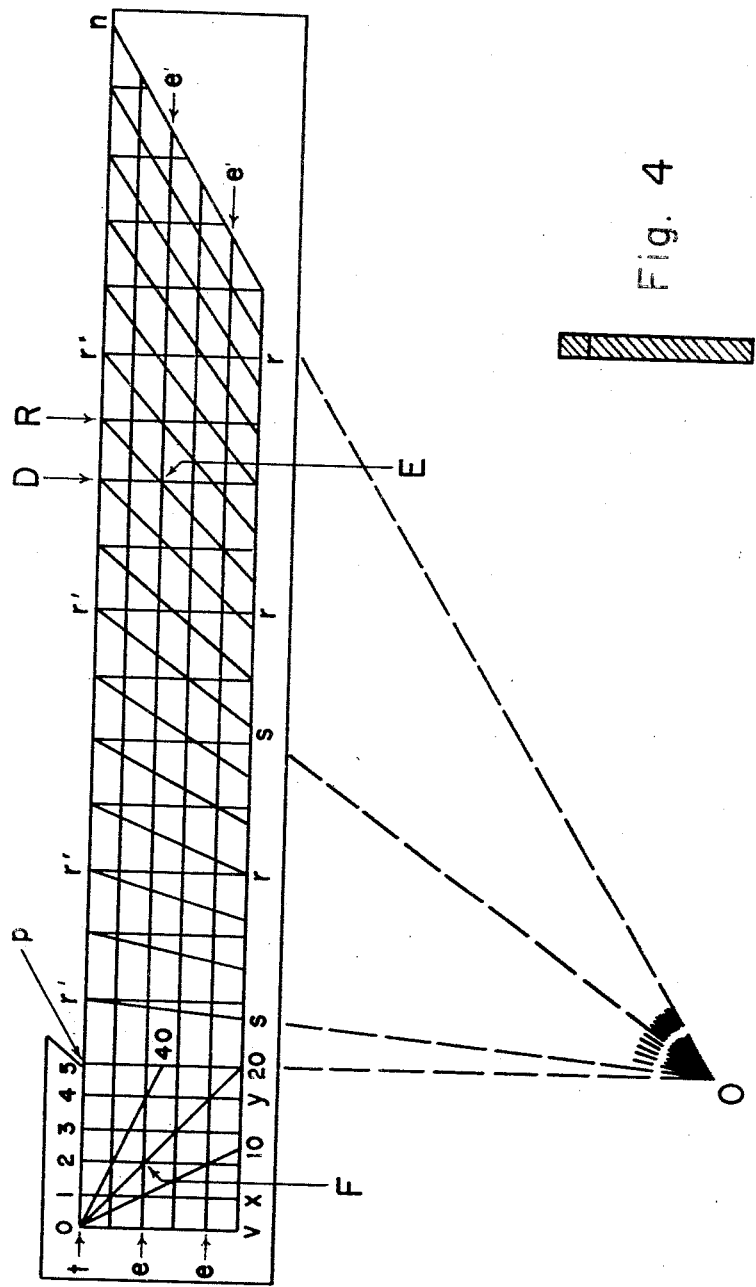

Sept. 30, 1941.  F. Z. PIRKEY  2,257,124
PHOTOGRAPH CORRECTOR SCALE
Filed Sept. 10, 1940  4 Sheets-Sheet 3

Sept. 30, 1941.  F. Z. PIRKEY  2,257,124
PHOTOGRAPH CORRECTOR SCALE
Filed Sept. 10, 1940  4 Sheets-Sheet 4

Inventor
Frank Z. Pirkey
By Francis P. Vanderwerker
Attorney

Patented Sept. 30, 1941

2,257,124

UNITED STATES PATENT OFFICE 2,257,124

PHOTOGRAPH CORRECTOR SCALE

Frank Z. Pirkey, United States Army,
Los Angeles, Calif.

Application September 10, 1940, Serial No. 356,145

4 Claims. (Cl. 33—75)

(Granted under the act of March 3, 1883, as
amended April 30, 1928; 370 O. G. 757)

This invention described herein may be manufactured and used by or for the Government for governmental purposes, without the payment to me of any royalty thereon.

This invention relates generally to measuring instruments, but more particularly to a graphical method and means for determining from aerial photographs of the terrain, the relative geographical location of marker points vertically projected upon a datum plane.

In the method disclosed herein the photographs which are taken at a given elevation with respect to the datum plane are corrected for tip and tilt, and usually overlapped and enlarged to suit a predetermined scale.

One object of the invention is to provide a rapid, convenient and accurate method and means whereby points of known elevation appearing on an aerial photograph may be corrected and plotted in the positions they would have occupied in the photograph had their elevations been zero with respect to the datum plane at the instant of exposure of the camera.

Another object of the invention is to provide a map substitute or photographic map which can be rapidly and economically prepared and reproduced and which combines the pictorial advantages of an aerial photograph with the accurate measurements of a topographic map. The invention conversely also provides a rapid accurate graphical method and means of plotting photographic distorted positions of a point when its correct position is known.

Another object of the invention is to provide a method and means for graphically making accurate horizontal, vertical and directional measurements on a specially prepared photographic map.

With these and other objects in view, this invention relates to certain procedure in the method, and novel details of construction, combination and arrangement of parts in the device herein set forth as will be more fully herein described and claimed.

Referring to the figures in which like parts are designated by similar reference characters:

Fig. 3 is a plan of the photo-corrector scale showing details of construction;

Fig. 4 is an end elevation of the corrector scale shown in Fig. 3;

Figure 1:
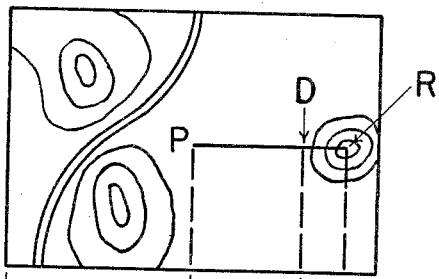
Fig. 1 is a plan view of the terrain as represented by a truly vertical aerial photograph with elevation contours shown thereon.

The instant invention permits rapid, accurate graphical plotting on a photograph, or an overlay thereon, of the correct horizontal location with respect to a given datum plane of the vertical projection on the datum plane of ground points appearing in the photographs, and whose ground elevation with respect to the given plane is known. It thus permits accurate measurements of the correct horizontal distance between points so corrected, together with accurate measurements of direction of the lines joining said points. Thus the invention supplies a means of making rapid and accurate measurements of true horizontal distances between and the directions of lines joining points appearing on the truly vertical aerial photographs, or oblique aerial photographs transformed or rectified to the vertical, without any calculation, the entire method being graphical.

Before describing the details relative to the construction and operation of the corrector scales, a general outline respecting the taking of the aerial photographs, and the steps in the entire method used will be described as set forth below.

A vertical datum plane is first assumed for the terrain to be photographically mapped. The datum may be assumed below the lowest terrain point, above the highest terrain point or anywhere in between. (See Figs. 1 and 2.) In these illustrations the lines $npn$ indicate the datum plane, O the center of the camera lens and $n'Pn'$ the surface of the photographic film or plate. It is considered simpler to assume a datum below the lowest terrain point, and the following description will be based on this assumption. Sea level is therefore assumed the datum plane.

A series of approximately vertical photographs is then rectified to compensate for tip and tilt by means of ground control and a rectifying camera such as the Zeiss SEG I, or data registered on the photograph by the aerial camera giving the tip and tilt may be set off on the rectifying camera or by any other suitable means.

Each rectified aerial photograph is then enlarged or reduced to correspond to the common datum plane (sea level) according to the altitude above datum at which the photograph was taken, after which the plumb point P of the rectified picture is accurately located and marked thereon. This point may be determined by a simple calculation from the tip and tilt and altitude of the camera.

A uniform rectangular grid system is then superimposed over the rectified photograph in correct relation to the plumb point and the grid system is also correctly oriented with respect to the true horizontal location of all other points appearing on the rectified photograph.

Elevations of features appearing on the rectified photograph are then designated by contours or other means, and suitable grid numbers corresponding to the uniform grid system are then marked on each grid line.

The order of these operations may be varied and some combined with others.

The general theory underlying this method is as follows:

If the terrain photo-mapped were entirely flat and horizontal and each picture were truly vertical, each picture need only be enlarged or reduced a certain amount corresponding to the altitude at which taken in order to conform to the common datum (sea level). In this way, all photo-maps would have the same scale and accurate horizontal measurements could be made on the photo-maps as on a topographical map. There would be no error due to tip or tilt of the pictures and no displacements due to elevation of terrain points occurring above or below datum. In a truly vertical aerial photograph or in one rectified to eliminate or compensate for tip and tilt, the only distortion or error in the horizontal location of features appearing in the photograph is that due to the ground elevations above or below datum of the points in question. In other words, where the ground elevation of a point appearing in the photograph is above datum, such as point $e$ in Fig. 2, it appears in the photograph at R displaced away from the plumb point an amount D—R, the displacement depending on the amount of elevation and the altitude above datum at which the picture was taken. (If the elevation of the point is below datum, it is displaced toward the plumb point.) It will be assumed for illustration that datum is sea level and all points have plus elevation.

Since in a photographic map the rectangular grid system is correctly located with respect to the plumb point it is only necessary to set any desired point on the photograph toward the plumb point an amount equal to its displacement due to elevation of ground and of camera and its true horizontal location is obtained and its true coordinates may be read from the photographic map. This correction of points may be conveniently done on a transparent overlay which has been registered with respect to the grid system. When two points are thus corrected a line may then be drawn between them and the grid deflection angle of the line can be accurately measured with a protractor or by other means. The displacement of points and their correction may be calculated or points may be corrected by means of a graphical corrector scale as shown in the illustrations, the edge of which runs through the plumb point and the point to be corrected.

By this method a map may be rapidly and accurately constructed showing only those points desired for the purpose of measuring true horizontal distances and true directions. To facilitate the layout or measurement of photographic maps the corrector scales as described below have been devised.

Figure 2:
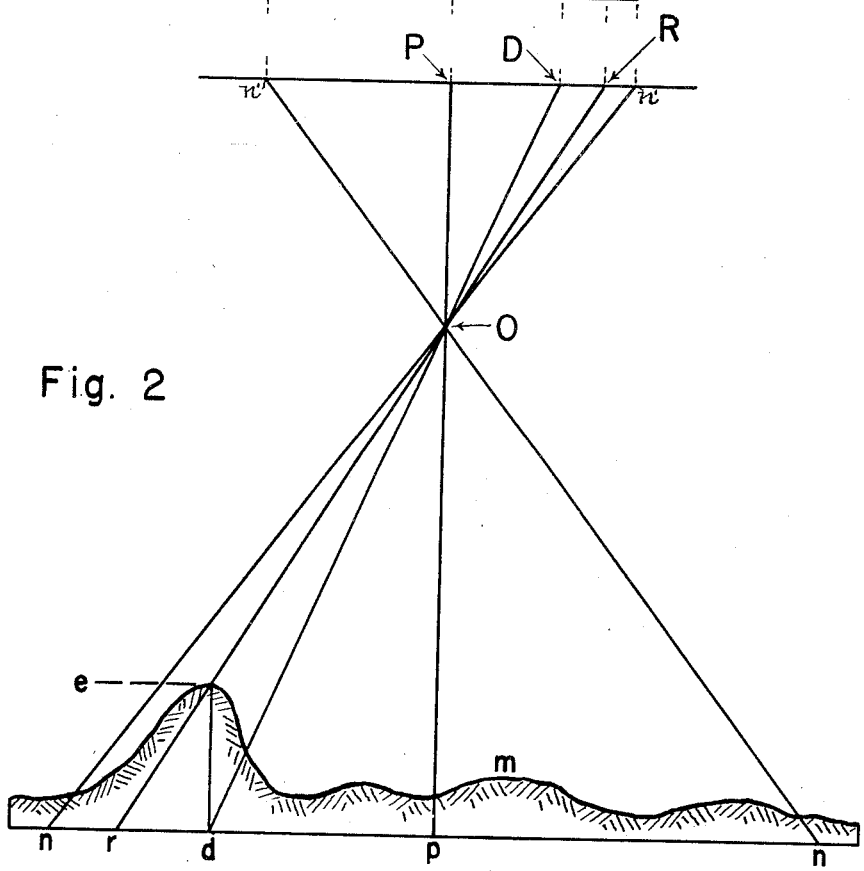
Fig. 2 is an elevation showing the passage of rays from points on the terrain through the camera lens, to corresponding points on the sensitized film or plate.

Referring to Fig. 1 in detail, R is the actual location in the photograph of ground point $e$ in Fig. 2. D in Fig. 1 is the correct location of R with respect to the datum plane $nrdpn$ in Fig. 2. In other words, if the elevation of point $e$ in Fig. 2 were zero or lay in the datum plane at $d$ at the instant of exposure of the camera, R would appear in the photograph at D (Fig. 1). DR is then the amount of distortion or displacement in the photograph of R, due to elevation of the ground point $e$ (Fig. 2) above the datum plane $nrdpn$. Distortions or displacements in a vertical photograph due to elevations above the datum plane occur on a line joining the plumb point P (Fig. 1) and the point in question R. Elevations above the datum plane cause displacements away from the plumb point and elevations below the datum plane cause displacements toward the plumb joint.

The amount of distortion RD (Fig. 1) is determined by the equation $$RD = \frac{de}{pO} PR$$

(see also Fig. 2). For the purpose of simplicity a datum plane is assumed so that all ground elevations are plus or all ground points lie above the datum plane. However, the same general principles apply, should the datum plane be chosen above all ground points so that all ground elevations are minus, or should an intermediate datum plane be chosen so that some ground points are above the datum plane and some points are below the datum plane.

Referring to Fig. 3 in detail, the aerial photograph corrector is constructed as follows: the plumb line $pO$ is drawn through the plumb point perpendicular to the radial edge $pn$. The radial edge $pn$ is assumed as the datum plane for elevations, and elevations are marked off on the plumb line $pO$ (for example, every 100 feet up to an elevation of 5,000 feet) to any convenient scale (for example, 0.08 of an inch=100 feet). Elevation lines $ee$ are then drawn through these points extending both to the right and left of the plumb line and parallel to the radial edge or datum $Pn$. The altitude of camera (for example 20,000 feet) is laid off on the plumb line $pO$ to the same scale giving the location of the center of the camera lens O. Vertical lines $rr'$ perpendicular to the radial edge or datum $pn$ are next drawn to the right of the plumb line $pO$ at any convenient interval (for example, at every 0.18 inch). Then from the center of the camera lens O and to the right of the plumb line, inclined lines $Osr'$ representing light rays, are drawn to the foot $r'$ of each vertical line $rr'$ on the radial edge $pn$. Then on the radial edge $pn$ and to the left of the plumb line, intervals 0, 1, 2, 3, 4, 5 equal to the elevation intervals on the plumb line are marked off (in this case, 0.08 inch=100 feet) and at these intervals lines are drawn perpendicular to the extension of $pn$ or $pt$. These elevation intervals on $pt$ to the left of the plumb line are then designated with their proper elevation number, with zero to the left at $t$, the plumb point being designated in this case elevation 5,000 feet. Next a camera altitude line $t$ 20 is drawn from the point marked zero or focal point $t$ on the radial edge to a point on the plumb line 20, a distance above the plumb point on the radial edge or datum, equal to $tp$. This last drawn camera altitude line corresponds to a camera altitude above datum, in this case, of 20,000 feet. Other inclined lines from the focal point to the plumb line are indicated at suitable inclinations corresponding to other camera altitudes above datum. In order to avoid confusion in use, the major portion of these other inclined lines may be omitted, the user drawing in with pencil or other means the omitted portion of the line to be used. This pencil line may later be erased when it is no longer needed. The indicated points on the plumb line to which camera altitude lines are drawn are determined in the following manner, for example; for a camera altitude of 40,000 feet above datum, the elevation on the plumb line above the plumb point equals $$\frac{20,000}{40,000} \times 5,000 \text{ feet}$$

or 2,500 feet or at the scale previously chosen for elevations on the plumb line, $2,500 \times 0.08$ inch $= 2$ inches.

In the use of the invention, the photo corrector scale is laid on the rectified photograph with the plumb point of the scale coinciding with the plumb point P on the photograph (see Fig. 1), and with the radial edge of the scale passing through the point on the photograph referred to as the photographic point R, which it is desired to correct. This may be done directly on the photograph or on a partially transparent overlay laid over the same. The elevation of the photographic point if not known, is then determined from the photograph by some indication thereon as elevation contours, system of numbers or other means. Next enter the scale at the proper elevation marked on the radial edge to the left of the plumb point $tp$, Fig. 3 say 2,000 feet, proceed vertically to the inclined line designating the camera altitude (in this example, 20,000 feet above datum) see point F Fig. 3, proceed to the right along the elevation line $eFe'$ (Fig. 3) so determined (in this case, 2,000 feet) to the intersection with the light ray RE (Fig. 3) from the photographic point R (interpolating between light rays if necessary) thence proceed vertically from E to D on the radial edge (interpolating between vertical lines $rr$ where necessary) and then plot the corrected point D.

The several types of aerial photograph correctors set forth herein may be drawn, printed, etched, lithographed or by any other means reproduced on a flat thin sheet of transparent partially transparent, or opaque substance, such as metal, paper, Celluloid, etc. If the substance is sufficiently transparent the scale may be reproduced either on the under side or the top side of the substance, but if the substance is opaque the scale must, in order to be readily visible, be reproduced on the top side. If the scale is reproduced on the bottom side of a sufficiently transparent substance, the camera altitude lines from the focal point $t$ (Fig. 3), zero on the elevation scale, toward the plumb line may be completed on either the bottom side or the top side by drawing pencil lines or by other means. The proper camera altitude lines may be indicated by interpolation between the camera altitude lines indicated on the scale. Should the ground elevation of any photographic point exceed the limits of the scale (in this case, 5,000 feet), the photographic point may be corrected by ½ of the actual ground elevation and the correction doubled or any other suitable fraction other than ½ may be utilized for the purpose, using the corresponding augmented correction. Should a datum plane be chosen above all ground elevations, the light rays $rsO$, Fig. 3, may be inclined from the vertical to the right of the vertical lines $rr'$ by the same amount they are inclined to the left of the vertical lines $rr'$, as shown in Fig. 3. Should a datum plane be chosen so that some ground elevations are plus and some are minus, both sets of light rays may be included.

Along the back edge of the scale or the edge opposite to and parallel to the radial edge, a convenient scale may be added if desired, such as a scale of inches or a scale of yards, etc.

The portion of the scale to the left of the plumb line may be omitted rendering the scale readily suitable for one camera altitude for which drawn. In this case, the ground elevations may be indicated at the proper intervals on the plumb line and also at the right end of the scale.

Figure 6:
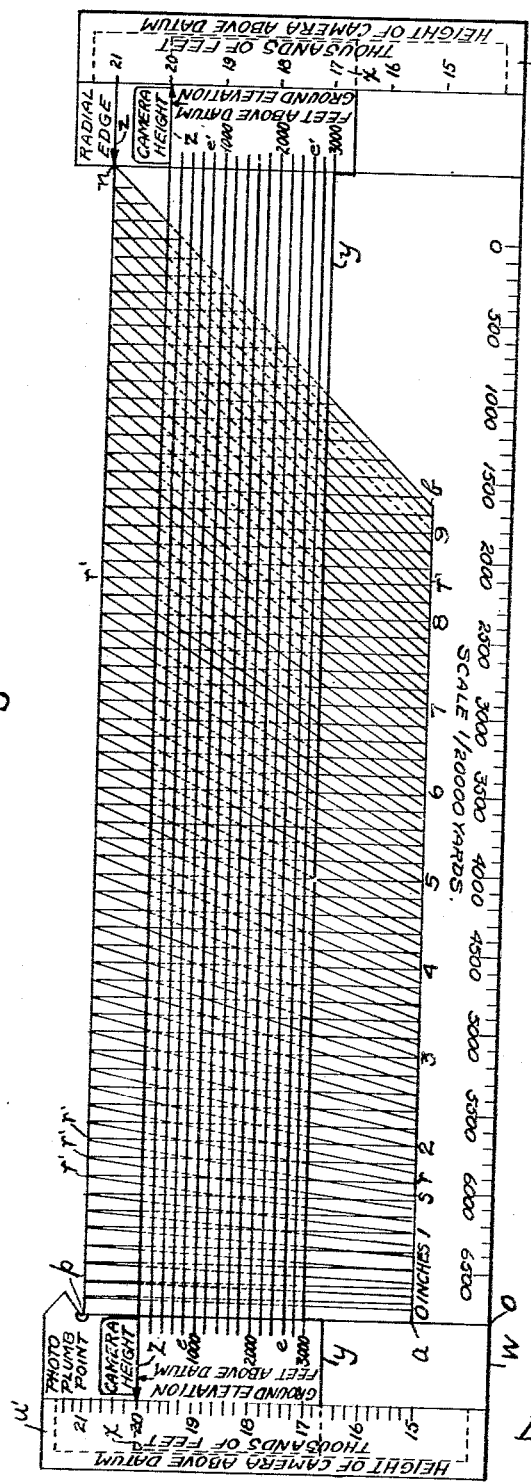
Fig. 6 is a plan view of another modified form of corrector scale, provided with a vertically sliding scale adjustable to different camera attitudes.
Figure 7:
Fig. 7 is an elevation of the corrector scale shown in Fig. 6.

The invention is susceptible of various changes in its form, proportions, and minor details of construction such as providing a vertical sliding scale for the horizontal elevation lines $ee$ (Fig. 3) in place of being fixed with respect to the radial edge in order to be adjustable for different camera altitudes, or providing a vertically adjustable position for the center of camera lens O (Fig. 3), together with a pivoted arm or a thread in place of the light rays $Osr$ in order to be adjustable for different camera altitudes or drawing the lights rays $Osr$ at equal angular intervals to make the scale suitable also for use as a protractor, etc. Several of the modified forms of the corrector scale are illustrated in Figs. 5, 6 and 7 and below.

Figure 5:
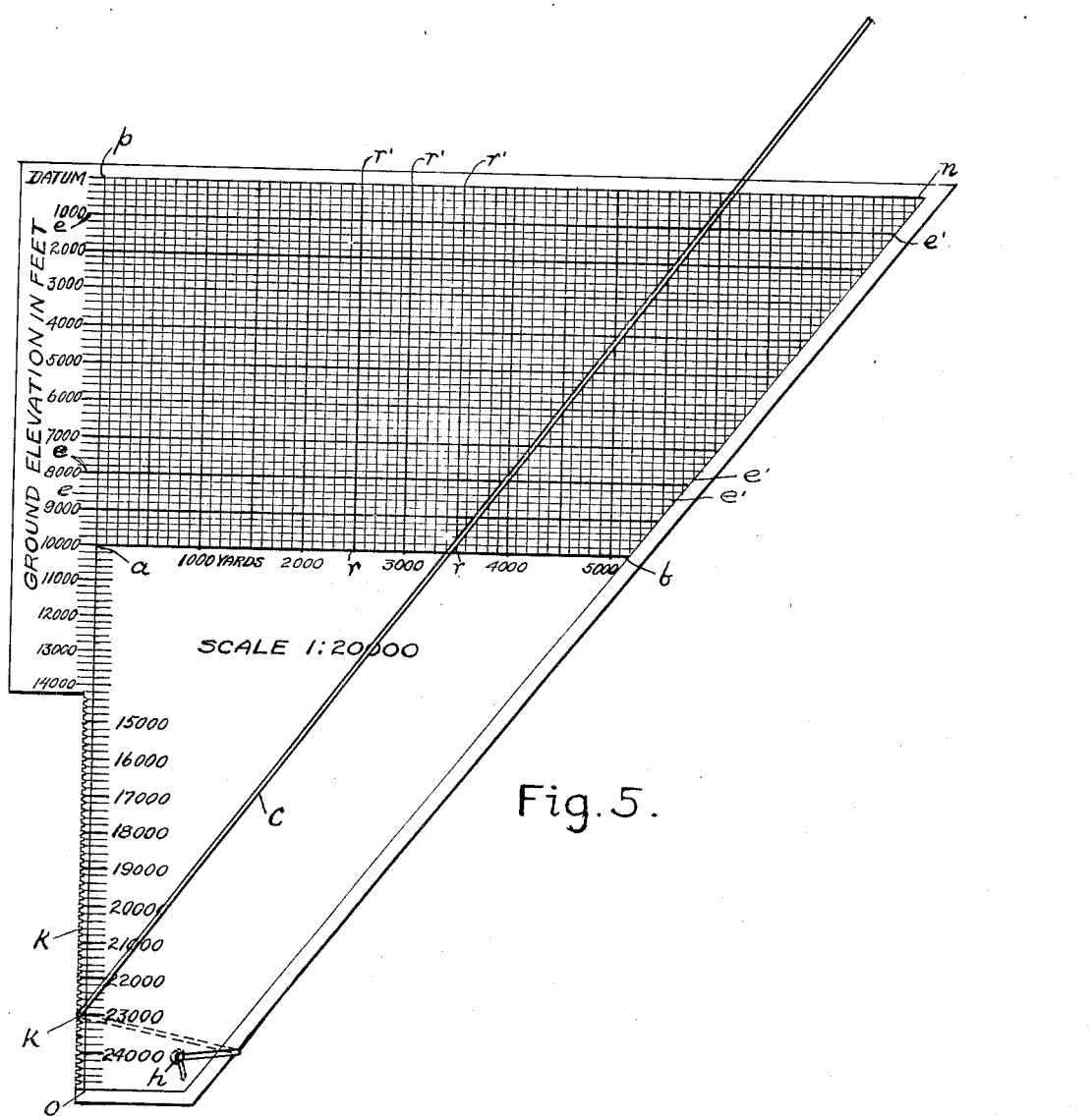
Fig. 5 is a plan view of a modified form of corrector scale employing a cord for determining angular projection.

In the modified form of corrector scale shown in Fig. 5, $po$ indicates the plumb line and $pn$ the radial edge which is perpendicular to the plumb line and which is assumed to indicate the datum plane for the measurement of elevations. Equally spaced radial lines $rr'$ are drawn on the corrector scale parallel to the plumb line, and equally spaced elevation lines $ee'$ are drawn parallel to the datum line $pn$. The lines $rr'$ are parallelly spaced and graduated at 100 and 1000 yards along a base line $ab$, and the elevation lines are parallelly spaced and graduated in 200 and 1000 feet along the plumb line $po$. However any other suitable scales may be used.

The lower portion of the plumb line graduations, that is from 15,800 to 24,800 feet are notched at their extremities to receive a cord C which is fastened to the corrector scale by passing it through a hole $h$ and forming a knot at its extremity. This cord when seated in a notch $k$ corresponding to a lens elevation and extended to a point on the radial edge $pn$ corresponding to the distance on the photograph of some marker point from the plumb line, functions to indicate a projection ray in a similar manner as the ray lines $sr$, as shown in Fig. 3.

With the construction shown in this modified form adjustment respecting elevations, and the direction rays from the notches to any point along the radial line $pn$ can be easily shown.

Another modified form of the device is shown in Figs. 6 and 7, in which the corrector scale is formed with base member $w$, provided with a plumb line $po$ and a radial line $pn$, as well as equally spaced radial lines $rr'$ and lines $sr'$ indicating rays as shown in Fig. 3. This base member is formed at either end thereof with grooves for the reception of a vertically slidable elevation member y which is marked with longitudinally extending equally spaced elevation lines ee' for indicating variations in height with respect to the datum plane. This elevation member is slidably connected to the base member y by inserting its lateral edges beneath retaining strips u and u', which are supported above the upper surface of the base member by spacing strips v and v'.

The elevation member y is graduated in 200 foot distances and marked every 1000 feet, and is provided with arrow markers z at its zero indications; the arrows being adjacent to similarly graduated vertically arranged scales on the retaining strips u and u'.

The operation of this type of scale is similar to the scale shown in Fig. 3, with the exception of manner in which elevation readings are made. In this modified form of corrector scale the slidable member y allows for vertical adjustment of the elevation lines ee' with respect to the ray lines sr' which facilitate the setting of the instrument for procuring readings at various elevations.

Having described my invention, what I claim as new and wish to secure by Letters Patent is:

1. A measuring device for determining the amount of deviation between the perspective projection of points in a vertical aerial photograph taken with the camera lens at a given distance above a datum plane and marked with a plumb point, and the orthographic projection of the identical points thereon comprising, a transparent chart composed of a base member containing a plumb line, adapted to be superimposed upon the plumb point of said photograph, equally spaced vertical lines parallel to said plumb line for measuring the distance from said plumb point to a given point on the photograph, a radial line perpendicular to said plumb line, ray lines emanating from a point in said plumb line terminating at the intersection of said vertical lines with said radial line, and a vertically slidable transparent member attached to said base member provided with equally spaced elevation lines parallel to said radial line and adapted to indicate on said ray lines lengths whose vertical projection upon said radial line indicate the perspective deviation of points on the photograph for said given elevation.

2. A measuring device for determinating the deviation between the perspective projection of points in a vertical aerial photograph taken with the camera lens at a predetermined elevation with respect to a datum plane and having a plumb point indicated thereon, and the orthographic projection of said points thereon comprising a chart of transparent material inscribed with a plumb line, a radial line perpendicular to and intersecting said plumb line at a plumb point, said plumb point and said radial line adapted to be superimposed respectively upon the plumb point of said photograph and other points thereon, equally spaced elevation lines parallel to said radial line and terminating in notched extremities at said plumb line adapted to define the elevation of the camera lens above the datum plane, equally spaced vertical lines parallel to said plumb line adapted to define distances from said plumb point, and provided with a string attached at one end to said chart and adapted to be engaged in a notch in said plumb line and extended across said elevation lines to a perspective point on said radial line to define a perspective ray, the portion of said ray extending between said perspective point and the elevation line, defining the distance to the datum plane, indicating on a vertical projection on said radial line, the perspective deviation of said points from the orthographic projection thereof.

3. A measuring device for graphically determining the orthographic projection of points of known elevation perspectively represented in vertical aerial photographs comprising, a coordinate scale graduated respectively in elevations and horizontal distances on its axes of ordinates and abscissae, and means comprising a cord adjustable on the surface of said scale for representing thereon the inclination of a light ray from said points of known elevation to the optical center of the camera lens whereby the intersection of the abscissae representing the heights of said points with said rays projected on the axis of abscissae determines the orthographic projection of said points.

4. A measuring device for graphically determining the orthographic projection of points of known elevation perspectively represented in vertical aerial photographs comprising a coordinate scale graduated respectively in elevations and horizontal distances on its axis of ordinates and abscissae, and movable means functioning in contact with the surface of said scale for representing thereon the inclination of a light ray from the points of known elevation to the optical center of the camera lens whereby the intersection of abscissae representing the heights of said point with said rays projected on the axis of abscissae determines the orthographic projection of said points.

FRANK Z. PIRKEY.